Jan. 20, 1959 K. SOLHEIM 2,870,438

CABINET WITH INTEGRAL TUBE MOUNTING MEANS

Filed Sept. 12, 1955 3 Sheets-Sheet 1

INVENTOR:
KARSTEN SOLHEIM,

BY Donald N. Timbie
HIS ATTORNEY.

Jan. 20, 1959 K. SOLHEIM 2,870,438

CABINET WITH INTEGRAL TUBE MOUNTING MEANS

Filed Sept. 12, 1955 3 Sheets-Sheet 2

INVENTOR:
KARSTEN SOLHEIM,
BY Donald N. Timbie
HIS ATTORNEY.

Jan. 20, 1959 K. SOLHEIM 2,870,438

CABINET WITH INTEGRAL TUBE MOUNTING MEANS

Filed Sept. 12, 1955 3 Sheets-Sheet 3

INVENTOR:
KARSTEN SOLHEIM,
BY Donald N. Timbie
HIS ATTORNEY.

United States Patent Office 2,870,438
Patented Jan. 20, 1959

2,870,438

CABINET WITH INTEGRAL TUBE MOUNTING MEANS

Karsten Solheim, Syracuse, N. Y., assignor to General Electric Company, a corporation of New York Application September 12, 1955, Serial No. 533,617

8 Claims. (Cl. 340—367)

This invention relates to a novel cabinet structure having integral means formed thereon for supporting cathode-ray tubes.

The prior art has provided numerous devices for housing electronic devices which include cathode-ray tubes. The cathode-ray tube, as a rule, is supported on the chassis of the electronic device, which chassis and tube are mounted as a unit in the cabinet. Other arrangements include a structure associated with the cabinet by which the tube may be mounted and supported as distinguished from a cathode-ray tube support associated with the electronic device chassis. A large variety of these structures are found in television receivers constructed for home use by mass production techniques. In the use of such techniques, it is desirable to reduce the cost of the units involved by reducing the number of steps involved in their assembly and the number of parts.

Therefore, it is an object of this invention to provide a novel cabinet structure for electronic devices which include a cathode-ray tube, which cabinet structure has provided thereon an integral tube holding means.

It is another object of this invention to provide a novel cabinet for electronic devices including cathode-ray tubes, which cabinet is constructed so that the minimum number of parts and a minimum amount of time are required to assemble the tube in the cabinet and hold it firmly in its proper position.

It is a further object of this invention to provide a novel cabinet structure for electronic devices including cathode-ray tubes in which a unitary adjustable structure is provided for supporting the cathode-ray tube and which includes means for mounting a suitable cover and safety glass structure over the front of the face of the tube.

It is a still further object of this invention to provide an improved cover for a television cabinet in which safety glass may be quickly and securely mounted.

Briefly, one way of achieving the objects of this invention is by the provision of a cabinet which may have a generally rectangular cross-section configuration. The cabinet may, if desired, be punched and cut out of a single sheet of metallic material. When so punched and cut, the cabinet is provided with front and rear openings. During the punching and cutting process, a series of band portions are provided integral with the cabinet adjacent the front opening and generally encircling the front opening. The band portions are so arranged that adjacent ends of some of the bands may be drawn together by a suitable means and other ends are joined together as by welding. When so tightened, the band will firmly grip the periphery of a cathode-ray tube, a portion of which extends through the front opening. Also provided is a cover which has a safety glass mounted therein by clips. The surfaces of the cabinet adjacent the band portions are shaped to add strength to the cabinet and to provide a support for the cover which may be secured thereto by any suitable means.

The novel features which I believe to be characteristic of my invention are set forth with particularity in the appended claims. My invention itself, however, both as to its structure and method of assembly, together with further objects and advantages thereof, may best be understood with reference to the following description taken in conjunction with the accompanying drawing in which:

Figure 1:
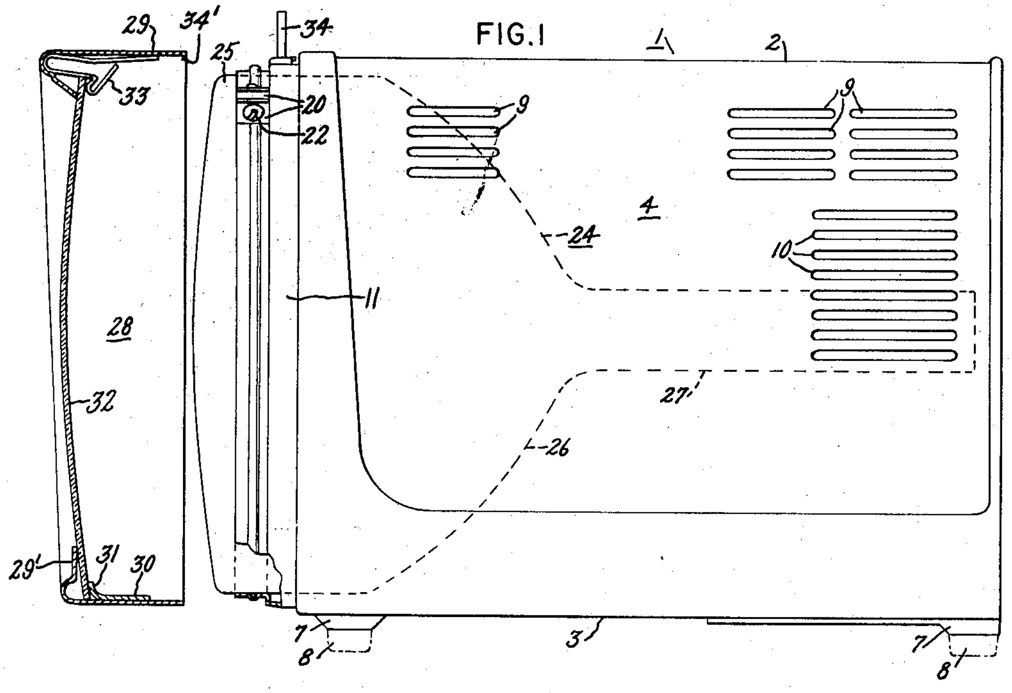
Figure 1 is an exploded side view of a cabinet embodying my invention.
Figure 2:
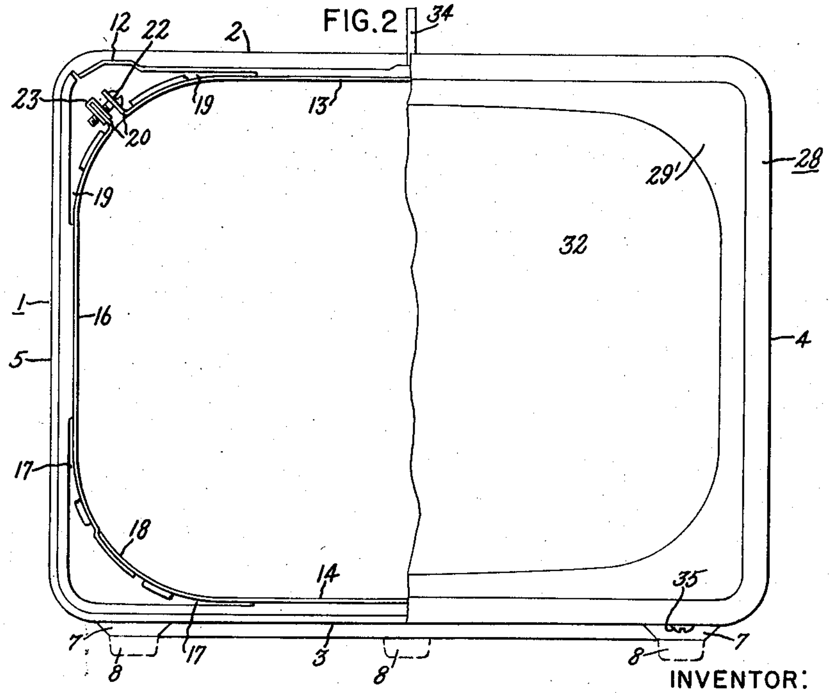
Figure 2 is a front view of the cabinet with a portion of the cover cut away.

In Figures 1 and 2 of the drawing, there is shown a cabinet designated generally by reference number 1. The cabinet may be cut and/or punched out of a single sheet of metallic material and bent to the desired configuration. In the embodiment illustrated, the cabinet is constituted by a body portion or box having a top 2, a bottom 3 and a pair of sides 4 and 5, connecting the top and bottom so that in cross-section, a generally rectangular configuration is presented. The structure thus formed, presents a front and rear opening into which elements of the electronic device may be inserted.

Figure 3:
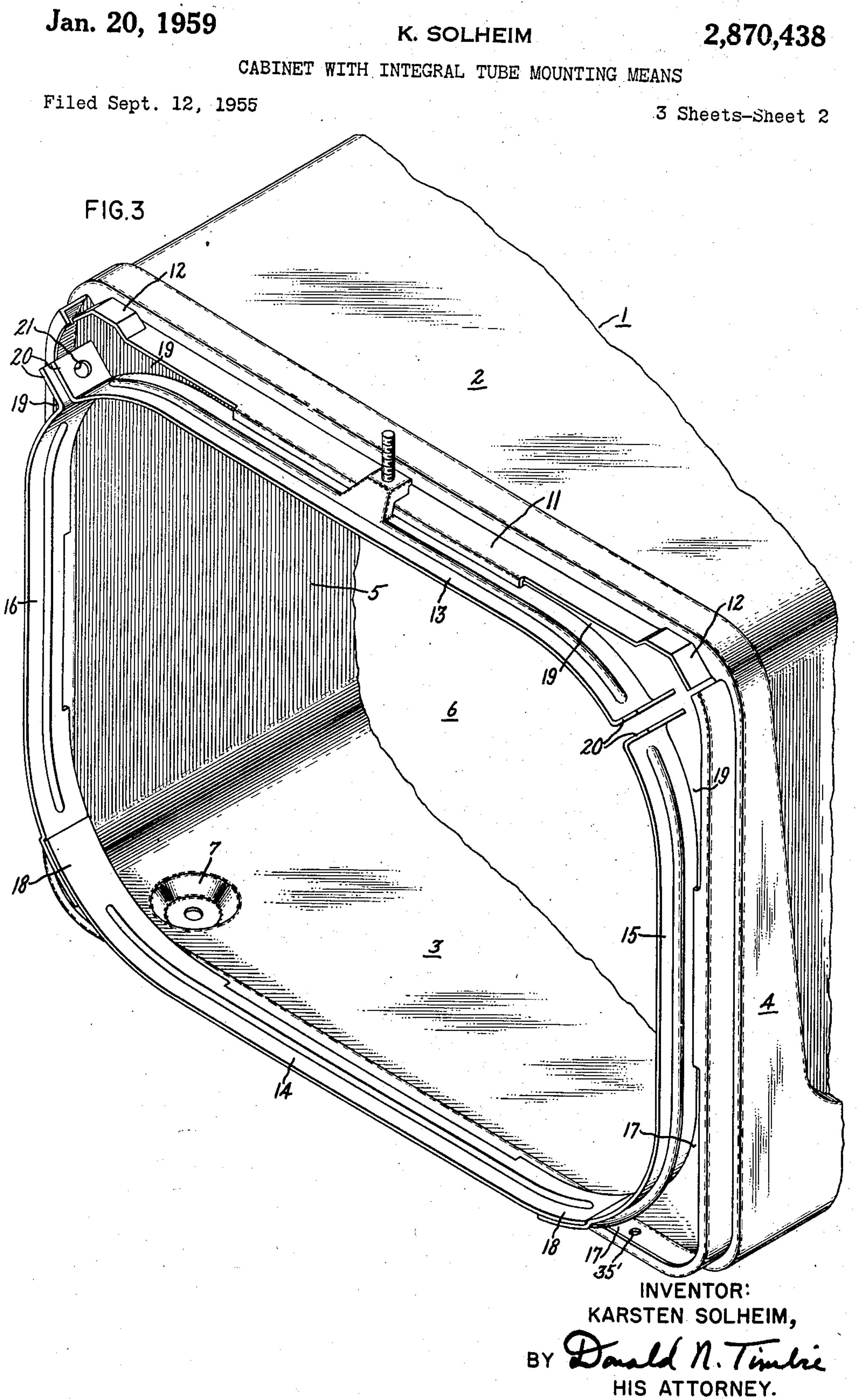
Figure 3 is a perspective view of the front of the cabinet embodying my invention.

In Figure 3 of the drawing a front opening is designated by reference numeral 6. During the punching operation, depressions 7 may be formed in the portion of the metal sheet which will constitute the bottom 3. The depressions 7 will function as supports or feet on which, if desired, suitable rubber or soft flexible pads 8 may be mounted. Also during the forming operation, apertures or openings 9 may be formed in side 4 or in any other suitable element of the body portion for purposes of ventilation. If desired, additional apertures or slots 10 may be formed therein so as to provide an outlet for a loudspeaker to be mounted in the cabinet.

The top 2, bottom 3 and sides 4 and 5 may have a supporting surface 11 formed adjacent the front opening. The supporting surface 11 is depressed below the periphery of the body portion forming a reduced section and may be cut and bent as shown at 12 in order to take up the excessive material and provide means on which a cover may be held by a frictional fit. Formed on the supporting surface 11 is a band portion 13 which constitutes a part of a cathode-ray tube clamping element. A similar band portion 14 is formed on the bottom supporting surface. Extending between the band portions 13 and 14, the sides 4 and 5 have matching band portions 15 and 16 formed thereon as integral constructions. The lower ends of the side band portions 15 and 16 and each end of the bottom band portion 14 are cut away from the supporting surface as shown at reference numeral 17 so that only the central portion of the band portion is still integral with the supporting surface. These ends are curved toward each other and overlie each other to form a lap joint 18 which may be made permanent as by welding or other suitable means. Each end of the top band portion 13 and the upper ends of the side band portions 15 and 16 are cut away from their respective portions of the supporting surface 11 as shown at 19 and forms an adjusting means whereby the clamping element may be tightened. The end of the band portion 15 and the end of the band portion 16 and both ends of the band portion 13 have bent sections 20 formed thereon. Provided in each bent section 20 is an opening 21. Passing through the openings 21 is an externally threaded element 22 as best seen in Figures 1 and 2. A cooperating internally threaded element 23 overlies one of the band sections 20 and engages the shank of the externally threaded element 22. A cathode-ray tube 24, which may constitute a picture tube of a television receiver, passes through the front opening 6 as seen in Figure 1. The periphery 25 of the cathode-ray tube 24 is encompassed by all of the band portions 13, 14, 15 and 16 which in their entirety, constitute a split band clamp. In accordance with conventional structure, the tube tapers back as shown at 26 to a neck portion 27. When it is desired to assemble the cathode-ray tube 24 into the cabinet 1, the periphery 25 is positioned in the manner illustrated in Figure 1. The threaded elements 22 are then tightened to draw the bent sections 20 of the bands 13, 15 and 16 together. In this manner, the tube is firmly held in its proper position and no other support is required. The chassis constituting the rest of the electronic device may be inserted in the other end of the cabinet and mounted by any suitable means and the necessary connections made.

A cover, such as shown at 28, may now be placed over the front of the cabinet and the picture tube 24. The cover includes a generally rectangular frame 29 and a bezel 29′ which provides a facing. Inside the cover a permanently attached plate 30 having a bent-up end 31 supports the bottom edge of a curved piece of safety glass 32 which is inserted between it and the bezel 29′. The upper edge of the safety glass may be secured in position by the use of V-shaped spring clips, such as shown at 33. One end of the clip presses against the top of the cover and the other against the back of the safety glass to press it against the bezel 29′. The cover 28 is provided with an opening (not shown) which passes over the lug 34. The cover thus assembled rests on the supporting surface 11 and a lip 34′ provided thereon may engage behind the bent portions 12 thereby providing a smooth continuation of the body portion of the cabinet. A suitable threaded element, such as shown at 35 in Figure 2, may be passed through a hole in the bottom of the cover 28 and a hole 35′ in the bottom supporting surface 11 to complete the assembly of the cover to the cabinet.

Figure 4:
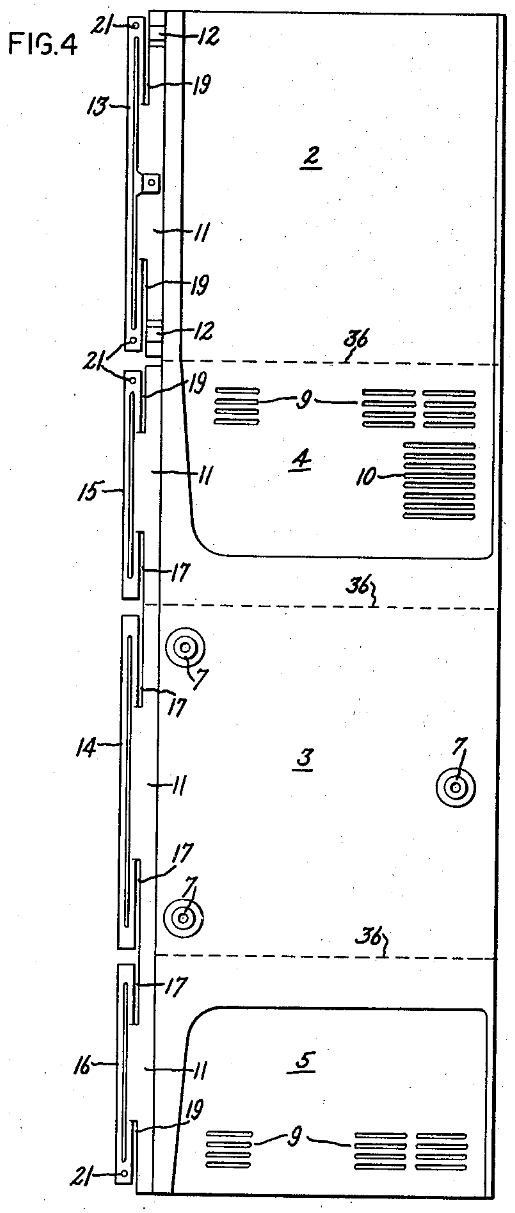
Figure 4 is a plan view of a blank from which the cabinet of Figures 1–3 may be fabricated.

Figure 4 of the drawing illustrates a cabinet blank punched and/or cut out of a suitable material such as metal. Score lines 36, which run transverse to the longitudinal axis of the blank, form panels which will constitute the top 2, the bottom 3 and sides 4 and 5 of the assembled cabinet. The supporting surface 11 is joined by depressing a strip of metal along one edge of the sheet and cutting and bending it as shown at 12. Upon the completion of these operations, the blank may be folded along its score lines 36 and the band formed as illustrated in the other figures.

The structure thus described is relatively inexpensive to fabricate, as it is essentially a unitary construction. After the cutting and punching, the cabinet is bent to the desired shape. The picture tube is mounted in the front opening and the threaded element 22 tightened to hold it. Such a construction involves a minimum number of parts and a minimum number of steps in its assembly. The cost of such a unit is thereby considerably reduced and at the same time a support of sufficient strength is provided for the elements of the electronic device.

While I have described a particular embodiment of my invention, other applications and arrangements will readily occur to those skilled in the art. I do not, therefore, desire my invention to be limited to the specific construction illustrated and described, and I intend by the accompanying claims to cover all modifications within the spirit and scope of my invention.

What I claim as new and desire to secure by Letters Patent of the United States is:

1. A cabinet for electronic devices including cathode-ray tubes, comprising a body portion adapted to house the chassis of an electronic device, one end of said body portion having formed integrally thereon clamping elements matching the configuration of a cathode-ray tube forming a part of the electronic device, said clamping elements including means whereby they may be tightened to hold a cathode-ray tube inserted therein.

2. A cabinet for electronic devices including cathode-ray tubes, comprising a body portion adapted to house the chassis of an electronic device, said body portion being produced with front and rear openings into which elements of the electronic device may be inserted, said body portion having an adjustable clamping element formed integrally thereon, said clamping elements being disposed adjacent said front opening, said clamping element being shaped to conform to the configuration of a cathode-ray tube mounted in said front opening, means on said clamping element whereby it may be adjusted and tightened.

3. A cabinet for electronic devices including cathode-ray tubes, comprising a body portion having a generally rectangular cross-sectional area, said body portion being provided with a front opening into which elements of the electronic device may be inserted, said body portion having a clamping element disposed adjacent said front opening, said clamping element being constituted by a split band formed integrally with said body portion and encircling said front opening, said band having at least one split formed therein, means engaging portions of said band adjacent said at least one split to pull the ends of the bands adjacent said split together to tighten said band and hold a cathode-ray tube passing through said front opening and encompassed by said band in position.

4. A cabinet for electronic devices including a cathode-ray tube, comprising a body portion having a top, a bottom, and a pair of sides interconnecting said top and bottom, said body portion being provided with a front opening and a rear opening, said bottom having a band portion formed integrally thereon adjacent said front opening, each of said sides having band portions joined integrally thereon adjacent said front opening, a first end of each of said side band portions being joined to opposite ends of said bottom band portion to form a continuous band, said top having a band portion formed integrally thereon adjacent said front opening, one end of said top band portion being curved toward the second end of the other of said side band portions, the second end of each side band portion being curved toward its respective top band portion end, means whereby each of second side band portion end and its respective top band portion end may be brought together to firmly grip a cathode-ray tube portion passing through said front opening.

5. A cabinet as defined in claim 4 wherein said means is constituted by bent sections on the ends of said top band portion, and on the second ends of said side band portion, and threaded means passing through said bent sections to bring said top band portion ends and said second side band portion ends together.

6. A cabinet for television receivers comprising a unitary body portion formed from a metallic material and having a top, a bottom and a pair of sides connecting said top and said bottom, said body portion presenting a front and a rear opening, an integral section of said body portion constituting a supporting surface by encompassing said front opening, a band portion integral with said body portion supporting surface coextensive with each of said top, bottom and sides, one end of the band portion coextensive with said bottom being joined with one end of the band portion coextensive with one side and the other end of said band portion coextensive with said bottom being joined with one end of the band portion coextensive with the other side, each end of the band portion coextensive with the top being disposed adjacent the other end of the band portion coextensive with its side to form a pair of adjusting means, tightening means associated with each adjusting means, a cover having a cross-sectional configuration matching that of said body portion supporting surface whereby it may be mounted thereon, said cover having safety glass mounted therein, and means to retain said cover on said body portions supporting surface.

7. A cabinet as defined in claim 6 wherein a plate is mounted in said cover and engages one end of said safety glass, spring clips engaging the other end of said safety glass and said cover to retain it in said cover.

8. A cabinet for supporting a cathode-ray tube and for enclosing an electronic chassis comprising in combination a container of rectangular cross-section having front and rear openings, bands extending along each edge of said front opening, the central portion only of each band being integral with the corresponding edge so that the portions of the bands beyond the central portions are flexible so that they may be drawn around the periphery of a cathode-ray tube.

References Cited in the file of this patent

UNITED STATES PATENTS

| | | |
|---|---|---|
| 1,515,156 | Michel | Nov. 11, 1924 |
| 2,165,779 | Blain | July 11, 1939 |
| 2,388,761 | Patterson, Jr. | Nov. 13, 1945 |
| 2,543,146 | Bace | Feb. 27, 1951 |
| 2,690,944 | Herron | Oct. 5, 1954 |
| 2,692,983 | Eisenkramer | Oct. 26, 1954 |
| 2,743,435 | Wayne | Apr. 24, 1956 |